United States Patent [19]

Sasama et al.

[11] 4,410,572

[45] Oct. 18, 1983

[54] PROCESS FOR PRODUCING AROMATIC POLYCARBONATE ARTICLE HAVING HEAT-CURED SURFACE LAYER

[75] Inventors: Shigeru Sasama; Nobuhiko Nakao, both of Mihara; Osamu Ohara, Matsuyama, all of Japan

[73] Assignee: Teijin Chemicals, Ltd., Tokyo, Japan

[21] Appl. No.: 352,221

[22] Filed: Feb. 25, 1982

[30] Foreign Application Priority Data

Mar. 2, 1981 [JP] Japan .................................. 56-28384

[51] Int. Cl.³ .............................................. B05D 3/02
[52] U.S. Cl. .................................. 427/407.1; 427/164; 427/168; 427/169; 427/387; 427/393.5
[58] Field of Search ...................... 427/164, 393.5, 387, 427/168, 169, 407.1; 428/412, 524

[56] References Cited

U.S. PATENT DOCUMENTS

| | | | |
|---|---|---|---|
| 4,190,669 | 2/1980 | Kanazawa et al. | 428/412 |
| 4,241,116 | 12/1980 | Taniyama et al. | 427/407.1 X |
| 4,242,412 | 12/1980 | Funaki et al. | 428/412 |
| 4,299,886 | 11/1981 | Soejima et al. | 427/163 |

Primary Examiner—Thurman K. Page
Attorney, Agent, or Firm—Sherman & Shalloway

[57] ABSTRACT

A process for producing a molded article of an aromatic polycarbonate having a heat-cured surface layer, which comprises (1) coating an aromatic polycarbonate article pretreated with a solution of an amino alcohol in a non-solvent for the aromatic polycarbonate, with a heat-curable film-forming liquid composition consisting of a solution, in a non-solvent for the aromatic polycarbonate, of (A) 100 parts by weight of methyletherified methylolmelamine, (B) 20 to 100 parts by weight of a short-chain glycol having 2 to 8 main-chain atoms between the two hydroxyl groups and represented by the following formula $$HO\text{-}(R^1O)_m\text{-}H \ldots \quad (1),$$

(C) 20 to 100 parts by weight of a long-chain glycol having at least 11 main-chain atoms between the two hydroxyl groups and represented by the following formula $$HO\text{-}(R^2O)_n\text{-}H \ldots \quad (2),$$

the total amount of the components (B) and (C) being 50 to 120 parts by weight, (D) 4 to 200 parts by weight of an initial condensate resulting from hydrolysis of a compound of the following formula $$R^3\text{-}(Si\text{-}OR^4)_3 \ldots \quad (3)$$

and (E) 1 to 20 parts by weight of a curing agent; and (2) heat-treating the coated aromatic polycarbonate article until the temperature reaches a range higher than 160° C. but not exceeding about 180° C. and maintaining it at a temperature within said range for about 10 to about 60 minutes.

8 Claims, No Drawings

PROCESS FOR PRODUCING AROMATIC POLYCARBONATE ARTICLE HAVING HEAT-CURED SURFACE LAYER

This invention relates to a process for producing a molded article of an aromatic polycarbonate having a heat-cured surface coating, and particularly, to a process for producing a molded article of an aromatic polycarbonate having a heat-cured surface coating which possesses improved properties, such as a high surface hardness (representing excellent scratch resistance), excellent weatherability, excellent wet heat resistance and excellent bendability under heat.

More specifically, this invention pertains to a process for producing a molded article of an aromatic polycarbonate having a heat-cured surface layer, which comprises (1) coating an aromatic polycarbonate article pre-treated with a solution of an amino alcohol in a non-solvent for the aromatic polycarbonate, with a heat-curable film-forming liquid composition consisting of a solution in a non-solvent for the aromatic polycarbonate of
  (A) 100 parts by weight of methyl-etherified methylolmelamine,
  (B) 20 to 100 parts by weight of a short-chain glycol having 2 to 8 main-chain atoms between the two hydroxyl groups and represented by the following formula

$$HO\text{-}(R^1O)_m\text{-}H \qquad (1)$$

wherein $R^1$ represents a main-chain alkylene group having at least 2 carbon atoms which may have an alkyl group with not more than 2 carbon atoms at a side chain, and m represents 1, 2 or 3,
  (C) 20 to 100 parts by weight of a long-chain glycol having at least 11 main-chain atoms between the two hydroxyl groups and represented by the following formula

$$HO\text{-}(R^2O)_n\text{-}H \qquad (2)$$

wherein $R^2$ represents a main-chain alkylene group having at least 2 carbon atoms which may have an alkyl group with not more than 2 carbon atoms at a side chain, and n represents an integer of from 3 to 20, the total amount of the components (B) and (C) being 50 to 120 parts by weight,
  (D) 4 to 200 parts by weight of an initial condensate resulting from hydrolysis of a compound of the following formula

$$R^3\text{-}(Si)\text{-}OR^4)_3 \qquad (3)$$

wherein $R^3$ represents a hydrocarbon group having 1 to 6 carbon atoms and $R^4$ represents an alkyl group having 1 to 4 carbon atoms, and
  (E) 1 to 20 parts by weight of a curing agent; and
(2) heat-treating the coated aromatic polycarbonate article until the temperature reaches a range higher than 160° C. but not exceeding about 180° C. and maintaining it at a temperature within said range for about 10 to about 60 minutes.

Molded articles of aromatic polycarbonate have such advantages as good transparency, good impact strength and light weight, and find various applications, especially as glass substitutes. However, the surface hardness of the aromatic polycarbonate articles is low, and these articles are susceptible to injury by sand, dirts, etc. and prone to lose transparency. This defect has precluded the polycarbonate articles from wider application.

In an attempt to remedy this defect, many methods have been proposed which involve coating a molded article of an aromatic polycarbonate with a thermosetting film-forming composition either directly or through a primer layer and heating the coated article to provide an aromatic polycarbonate article having a heat-cured surface layer.

For example, Japanese Laid-Open Patent Publication No. 101235/1977 (published on Aug. 25, 1977) discloses a composition comprising (a) methyl-etherified methylolmelamine, (b) an alkylene glycol or a polyalkylene glycol represented by the formula H—OR—$_n$OH wherein R represents an alkylene group having 2 to 4 carbon atoms and n is a positive integer of from 1 to 10, (c) an initial condensate resulting from hydrolysis of a compound of the formula R—Si—OR')$_3$ wherein R represents a hydrocarbon group having 1 to 6 carbon atoms, and R' represents an alkyl group having 1 to 4 carbon atoms, and (d) a curing agent as a coating composition useful for improving the scratch resistance of the surfaces of plastic articles including aromatic polycarbonate articles. This patent document, however, fails to give any description about the pre-treatment of a plastic article, nor the conjoint use of a short-chain glycol and a long-chain glycol as the glycol component of the coating composition. In addition, it teaches that the heat-curable film-forming composition is directly applied to a molded article of aromatic polycarbonate and then cured at 90° to 130° C. for 30 to 60 minutes to form a heat-cured surface layer.

Japanese Laid-Open Patent Publication No. 127928/1977 (published on Oct. 27, 1977) discloses another coating composition used for a similar purpose to the above patent document, which comprises (a) methyletherified methylolmelamine, (b) a short-chain glycol having not more than 8 main-chain atoms between the two hydroxyl groups and represented by the formula HO—(R$_1$O)$_m$—H wherein R$_1$ represents an ethylene group or an alkylene or polymethylene group having an alkyl group with not more than 2 carbon atoms in a side chain, and m is an integer of 1 to 8, (c) a long-chain glycol having at least 11 main-chain atoms between the two hydroxyl groups and represented by the formula HO—(R$_2$O)$_n$—H wherein R$_2$ represents an ethylene, propylene or polymethylene group and n is an integer of 3 to 20, and (d) a curing agent. This patent document neither describes anything about the pre-treatment of a plastic article. It teaches, as does the first-cited patent document, that the heat-curable film-forming composition is applied directly to an aromatic polycarbonate article and cured at 90° to 130° C. for 30 to 60 minutes to form a heat-cured surface layer.

Japanese Laid-Open Patent Publication No. 141873/1977 (published on Nov. 26, 1977) discloses the pre-treatment of a molded article of a polycarbonate resin including an aromatic polycarbonate with at least one amino alcohol having a primary or a secondary amino group in order to improve the adhesion to the polycarbonate article of a coating from a melamine-type paint, for example methyl-etherified methylolmelamine with or without a modifier such as an acrylic resin, a polyester, a polyether or a silicone resin. This patent document teaches that the heat-curable film-forming composition is coated on a molded article of an aromatic polycarbonate pre-treated with an amino alcohol solution in a non-solvent for the aromatic polycarbonate. However, it is quite silent on the conjoint use of a short-chain glycol and a long-chain glycol as the glycol component of the coating composition. Furthermore, as do the above-cited patent documents, this Japanese patent document also discloses that the applied coating is cured at 90° to 130° C. for 30 to 60 minutes.

Japanese Laid-Open Patent Publication No. 90337/1979 (published on July 18, 1979) discloses a coating composition prepared by dissolving in a solvent (a) a partial co-hydrolysis product of a tetraalkoxysilane of the formula $Si(OR^1)_4$ wherein $R^1$ represents an alkyl group having 1 to 4 carbon atoms and an organic trialkoxysilane of the formula $R^2Si(OR^3)_3$ wherein $R^2$ represents a hydrocarbon group having 1 to 6 carbon atoms and $R^3$ represents an alkyl group having 1 to 4 carbon atoms, and/or a mixture of the partial hydrolysis products of the respective silicon compounds, the weight ratio of the partial hydrolysis product of the tetraalkoxysilane calculated as $SiO_2$ to the partial hydrolysis product of the organic trialkoxysilane calculated as $R^2SiO_{1.5}$ being from 5:95 to 95:5, and (b) 10 to 500 parts by weight, per 100 parts by weight of the sum of the partially hydrolyzed tetraalkoxysilane calculated as $SiO_2$ and the partially hydrolyzed organic trialkoxysilane calculated as $R^2SiO_{1.5}$ in (a) above, of a mixture in a gram equivalent ratio of 1:0.5–1.5 of partially or wholly alkyl-etherified methylolmelamine and a monomer or oligomer having two or more hydroxyl groups or a precondensate of the above mixture. This patent document states that the resulting coating composition is useful for reducing the susceptibility of the surface of a substrate such as a polycarbonate article to injury, and exemplifies polyols, such as glycols or polyalkylene glycols having a molecular weight of less than 500, as the hydroxyl-containing monomer or oligomer. However, it fails to disclose anything about the conjoint use of a specified short-chain glycol and a specified long-chain glycol as in the present invention. It describes the use of heat-curing temperatures of at least 70° C., but in all of the working examples therein, the curing is effected with hot air at 130° C. for 2 hours. Moreover, this patent document is quite silent on the aforesaid pre-treatment.

Japanese Laid-Open Patent Publication No. 90377/1979 (published on July 18, 1979) discloses a molded article, such as a molded article of aromatic polycarbonate, having an undercoat layer of a specified polymer, which is quite irrelevant to the pre-treatment with an amino alcohol in the present invention, and an overcoat composed of (a) a partial co-hydrolysis product of a tetraalkoxysilane of the formula $Si(OR^1)_4$ wherein $R^1$ represents an alkyl group having 1 to 4 carbon atoms and an organic silicon compound of the formula $R^2_nSi(OR^3)_{4-n}$ wherein $R^2$ represents a hydrocarbon group having 1 to 6 carbon atoms, $R^3$ represents an alkyl group having 1 to 4 carbon atoms, and n represents an integer of 1 to 3, and/or a mixture of the partial hydrolysis products of the respective silicon compounds, the weight ratio of the partially hydrolyzed tetraalkoxysilane calculated as $SiO_2$ and the partially hydrolyzed organic silicon compound calculated as $R^2_nSiO_m$ (wherein $m=(4-n)/2$) being from 5:95 to 95:5, and per 100 parts by weight of the partially hydrolyzed tetraalkoxysilane calculated as $SiO_2$ and the partially hydrolyzed organic silicon compound calculated as $R^2_nSiO_m$ in (a) above, (b-3) 10 to 400 parts by weight of a monomer or oligomer having at least two hydroxyl groups and (c) not more than 300 parts by weight of etherified methylolmelamine, the amount of the etherified methylolmelamine being 0.5 to 1.5 times the gram equivalent of the monomer or oligomer (b-3). This patent document neither describes the conjoint use of a short specified short-chain glycol and a specified long-chain glycol as in the present invention. It teaches that the heat-curing temperature for the overcoat layer is from 70° C. to a temperature below the heat distortion temperature of a polycarbonate resin article, exemplifying the usual heat distortion temperature as 120° to 160° C., and the heat-curing time is from 10 to 200 minutes. All of the working examples in this patent document show that the heat-curing was carried out at 130° C. for a period of 1 or 2 hours.

The above-cited patent documents commonly disclose a temperature of 130° C. and a period of 1 or 2 hours as specific examples of the heat-curing conditions although some generally describe temperatures above 130° C. It was general technical knowledge to those skilled in the art that a heat-curable film-forming composition coated on a molded article of an aromatic polycarbonate is cured at a temperature which induces curing of this composition but is below the heat distortion temperature (most usually, about 130° to about 150° C.) of the aromatic polycarbonate article. Furthermore, it is well known that when the aromatic polycarbonate article is heat-treated for a relatively long period of time at its heat distortion temperature or temperatures in its vicinity, the good impact strength of the molded article is reduced. In view of the foregoing, it is rather natural that the prior art references should disclose only those examples in which the heat-curing of the heat-curable film-forming composition on the aromatic polycarbonate article was carried out at about 130° C. for not more than 2 hours.

Realizing that the prior art techniques discussed above cannot give an aromatic polycarbonate article having a heat-cured surface coating which possesses excellent impact strength, surface hardness, weatherability, wet heat resistance, bendability under heat, etc., the present inventors have made extensive investigations in order to develop a technique which can afford an aromatic polycarbonate article with a heat-cured surface layer having these excellent properties.

These investigations have led to the discovery that the aforesaid substantial deterioration in impact strength which necessarily occurs when the aromatic polycarbonate article having a heat-curable surface coating is heated at its heat distortion temperature or temperatures in its vicinity for a period of time sufficient to induce the desired curing of the heat-curable film-forming composition on the surface of the aromatic polycarbonate article can be avoided, and an aromatic polycarbonate article having desirable high impact strength can be obtained, by heating the above heat-cured article further until the temperature reaches a range higher than 160° C. and not exceeding about 180° C., preferably about 165° to about 175° C., and maintaining it at a temperature within this range for a period of about 10 to about 60 minutes, preferably about 15 to about 30 minutes.

It has also been found that even when an aromatic polycarbonate article pre-treated and then coated with the specified heat-curable film-forming composition is heat-treated under the aforesaid high-temperature conditions, no undesirable overcure occurs and the resulting aromatic polycarbonate article having a heat-cured surface layer has a high surface hardness (representing excellent scratch resistance), excellent weatherability, excellent wet heat resistance, excellent bendability under heat, etc. without sacrificing its inherent high impact strength.

It is an object of this invention therefore to provide a process for producing an aromatic polycarbonate article having a heat-cured surface coating, which exhibits improved properties.

The above and other objects and advantages of this invention will become more apparent from the following description.

In step (1) of the process of this invention, the surface of an aromatic polycarbonate article pre-treated with a solution of an amino alcohol in a non-solvent for the aromatic polycarbonate is coated with a heat-curable, film-forming liquid composition composed of a solution of the following components (A) to (E) in a non-solvent for the aromatic polycarbonate.

(A) 100 parts by weight of methyl-etherified methylolmelamine;

(B) 20 to 100 parts by weight of a short-chain glycol having 2 to 8 main-chain atoms between the two hydroxyl groups and represented by the following formula

$$HO\text{-}(R^1O)_n\text{-}H \qquad (1)$$

wherein $R^1$ represents a main-chain alkylene group having at least 2 carbon atoms which may have an alkyl group with not more than 2 carbon atoms at a side chain, and m represents 1, 2 or 3;

(C) 20 to 100 parts by weight of a long-chain glycol having at least 11 main-chain atoms between the two hydroxyl groups and represented by the following formula

$$HO\text{-}(R^2O)_n\text{-}H \qquad (2)$$

wherein $R^2$ represents a main-chain alkylene group having at least 2 carbon atoms which may have an alkyl group with not more than 2 carbon atoms at a side chain, and n is an integer of from 3 to 20, the total amount of the components (B) and (C) being 50 to 120 parts by weight;

(D) 4 to 200 parts by weight of an initial condensate resulting from hydrolysis of a compound of the following formula

$$R^3\text{-}Si\text{-}(OR^4)_3 \qquad (3)$$

wherein $R^3$ represents a hydrocarbon group having 1 to 6 carbon atoms, and $R^4$ represents an alkyl group having 1 to 4 carbon atoms; and (E) 1 to 20 parts by weight of a curing agent.

In step (2) of the process of this invention, the coated aromatic polycarbonate article is heat-treated until the temperature reaches a value higher than 160° C. but not exceeding about 180° C. and maintained at a temperature within this range for a period of about 10 to about 60 minutes.

The aromatic polycarbonate used in step (1) may be any aromatic polycarbonates obtained by methods known per se, for example those obtained by reacting dihydric phenols, preferably a bisphenol, with carbonate precursors such as phosgene or diaryl carbonates (e.g., diphenyl carbonate). This reaction of forming the aromatic polycarbonates can be carried out by reacting a dihydric phenol with a carbonate precursor such as phosgene in the presence of an acid acceptor and a molecular weight controlling agent, or by ester interchange reaction between a dihydric phenol and a carbonate precursor such as diphenyl carbonate.

Preferred dihydric phenols are bisphenols, and bisphenol A [i.e., 2,2-bis(4-hydroxyphenyl)propane] is especially preferred. Bisphenol A may be partly or wholly replaced by another dihydric phenol. Examples of such other dihydric phenol include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, and halogenated bisphenols such as 2,2-bis(3,5-dibromo-4-hydroxyphenyl)propane.

The polycarbonate may also be a homopolymer of such a dihydric phenol, a copolymer of two or more of such dihydric phenols, or a mixture of such polymers and/or copolymers. In the present invention, polycarbonates derived from up to 10 mole% of the above-exemplified other dihydric phenols and the remainder being bisphenol A are preferably used. These polycarbonates may easily be available commercially.

These polycarbonates may also be used in the form of a blend with other thermoplastic resins. For example, there can be used a blend of such a polycarbonate with up to about 20% by weight, based on the polycarbonate, of a polyester such polyethylene terephthalate, polybutylene terephthalate, polyhexamethylene terephthalate, polyneopentyl terephthalate, a polyester obtained by co-condensing terephthalic acid, isophthalic acid and ethylene glycol, or a polyester obtained by co-condensing terephthalic acid, isophthalic acid and bisphenol A, or a blend of the polycarbonate with polystyrene.

The aromatic polycarbonate article can be obtained by molding the aromatic polycarbonate by known methods such as extrusion molding, injection molding and compression molding. The molding temperature is, for example, about 280° C. to about 340° C. The molded article may be in any desired shape, for example, in the shape of a film, sheet or flat plate having a thickness of not more than about 10 mm, preferably about 6 mm to about 0.5 mm.

The aromatic polycarbonate article used in the process of this invention is pre-treated with a solution of an amino alcohol. The amino alcohol is preferably an amino alcohol having a primary or secondary amino group and a hydroxyl group and a boiling point of not more than 300° C. Examples of the amino alcohol are monoethanolamine, diethanolamine, 2-aminopropan-1-ol, 1-aminoproapan-2-ol, 3-aminopropan-1-ol, 1-aminobutan-2-ol, N-methylethanolamine and N-ethylethanolamine. Amino alcohols having a boiling point above 300° C. are undesirable because they prolong the drying of the pre-treated layer and may adversely affect the surface condition of the aromatic polycarbonate article.

The solvent used for the preparation of the amino alcohol solution is a non-solvent for the aromatic polycarbonate, which can dissolve the amino alcohol but does not impair the transparency of the aromatic polycarbonate forming the aromatic polycarbonate article. Examples of such non-solvents suitably used for the formation of the amino alcohol solution are lower alcohols such as ethanol, isopropanol and isobutanol. They may be used either singly or in admixture. As required, these lower alcohols may also be used as a mixture with an ether, ketone or ester solvent. The solvent may be suitably selected by considering its ability to dissolve the aromatic polycarbonate. Examples of the ether are ethyl Cellosolve and butyl Cellosolve. Examples of the ketone are methyl ethyl ketone, methyl isobutyl ketone and diisobutyl ketone. Examples of the ester are ethyl acetate and butyl acetate.

The concentration of the amino alcohol solution can be properly selected, and is preferably about 0.1 to about 5% by weight.

The pre-treatment of the aromatic polycarbonate article with the amino alcohol solution can be performed by any known means, such as dip coating, flow coating, brush coating, roll coating or spray coating. The resulting film of the amino alcohol can be dried by known means, such as air drying, hot air drying, infrared heater drying, etc. Preferably, the drying is carried out at a temperature lower than about 130° C., for example room temperature to about 130° C. Thus, the aromatic polycarbonate article pre-treated with the solution of the amino alcohol in the non-solvent for the aromatic polycarbonate can be obtained. The pre-treatment can greatly improve the adhesion to the aromatic polycarbonate article of a coated layer to be formed from the aforesaid heat-curable, film-forming liquid composition.

The heat-curable, film-forming liquid composition to be applied to the pre-treated aromatic polycarbonate article includes the components (A) to (E) described hereinabove.

The methyl-etherified methylolmelamine used as component (A) is a product obtained by partly or wholly methyl-etherifying the methylol group of a methylolmelamine such as hexamethylolmelamine, pentamethylolmelamine or tetramethylolmelamine. Usually, it is used as a mixture of these methyl-etherified methylolmelamines.

The short-chain glycol as component (B) has 2 to 8 main-chain atoms between the two hydroxyl groups and is represented by the following formula $$HO\text{-}(R^1O)_m\text{-}H \ldots \quad (1)$$

wherein $R^1$ represents a main-chain alkylene group having at least 2 carbon atoms which may have an alkyl group with not more than 2 carbon atoms at a side chain, and m represents 1, 2 or 3.

The short-chain glycol includes both alkylene glycols and alkylene ether glycols. $R^1$ in formula (1) is an alkylene group having at least 2 carbon atoms and being present in the main chain, which may have a side-chain group. Such a side-chain group is an alkyl group having not more than 2 carbon atoms, that is, a methyl or ethyl group. The short-chain glycol (B) has 2 to 8 main-chain atoms between the two hydroxyl groups, whether it is an alkylene glycol or an alkylene ether glycol. For example, when $R^1$ is an ethylene group and m is an integer of 3, the number of main-chain atoms between the two terminal hydroxyl groups is calculated as 8. Examples of the alkylene group $R^1$ are ethylene, propylene, tetramethylene, hexamethylene, isobutylene and trimethylene groups.

Examples of the short-chain glycol (B) include ethylene glycol, propylene glycol, 1,4-butanediol, 1,6-hexanediol, diethylene glycol, triethylene glycol and ditrimethylene glycol. They may be used either singly or as a mixture of two or more. Of these, butanediol, diethylene glycol and triethylene glycol are preferred.

The long-chain glycol as component (C) has at least 11 (e.g., 11–60) main-chain atoms between the two hydroxyl groups and is represented by the following formula $$HO\text{-}(R^2O)_n\text{-}H \ldots \quad (2)$$

wherein $R^2$ represents a main-chain alkylene group having at least 2 carbon atoms which may have an alkyl group with not more than 2 carbon atoms at a side chain, and n is an integer of from 3 to 20.

The long-chain glycol of formula (2) is an alkylene ether glycol. $R^2$ in formula (2) is an alkylene group having at least 2 carbon atoms and being present in the main chain, which may have a side-chain group. Such a side-chain group is an alkyl group having not more than 2 carbon atoms, that is, a methyl or ethyl group. It is essential that the number of main-chain atoms between the two hydroxyl groups should be at least 11.

The manner of calculating the number of the main-chain atoms is the same as above $R^1$. Examples of the alkylene group $R^2$ are ethylene, propylene, trimethylene, tetramethylene and hexamethylene groups. Specific examples of the long-chain glycol (C) are polyethylene glycol, polypropylene glycol, polytrimethylene glycol and polytetramethylene glycol. Preferably, these long-chain glycols have a molecular weight of about 200 to about 1,000. They may be used either singly or as a mixture of two or more.

The component (D) is an initial condensation product resulting from the hydrolysis of a compound of the following formula $$R^3\text{-}(Si)\text{-}(OR^4)_3 \ldots \quad (3)$$

wherein $R^3$ represents a hydrocarbon group having 1 to 6 carbon atoms such as an alkyl, alkenyl or aryl group, and $R^4$ represents an alkyl group having 1 to 4 carbon atoms. Examples of the hydrocarbon group $R^3$ include alkyl groups such as methyl, ethyl, propyl and butyl groups, alkenyl groups such as vinyl and allyl groups, and a phenyl group. Examples of the alkyl group $R^4$ are methyl, ethyl, propyl and butyl groups.

Specific examples of the silicon compound of formula (3) include methyltrimethoxysilane, ethyltriethoxysilane, methyltriethoxysilane, methyltributoxysilane, phenyltrimethoxysilane and vinyltrimethoxysilane. The initial condensate of the silicon compound by hydrolysis can be produced by any known method. For example, it can be produced by hydrolyzing an alcohol solution of the silicon compound of formula (3) at a temperature of about 10° to about 25° C. by adding 0.01–0.1 N dilute hydrochloric acid in such a proportion that the hydrolysis is effected with 1.5 to 3 moles of water per mole of the silicon compound of formula (3).

Examples of suitable curing agents as component (E) are inorganic and organic acids such as hydrochloric acid, phosphoric acid, p-toluenesulfonic acid, oxalic acid and maleic acid. Salts of these acidic substances can also be used. These curing agents may be used singly or as a mixture of two or more.

The heat-curable film-forming liquid composition is composed of a solution of the components (A) to (E) in a non-solvent for the aromatic polycarbonate. It comprises 100 parts by weight of the methyl-etherified methylolmelamine, 20 to 100 parts by weight of the short-chain glycol (B), 20 to 100 parts by weight of the long-chain glycol, (D) 4 to 200 parts by weight of the initial condensate of the silicon compound of formula (3), and (E) 1 to 20 parts by weight of the curing agent, the total amount of the components (B) and (C) being 50 to 120 parts by weight.

When the proportion of the short-chain glycol (B) is smaller than 20 parts by weight or the proportion of the long-chain glycol (C) is more than 100 parts by weight, the surface hardness and scratch resistance of the resulting product are insufficient. When the proportion of the short-chain glycol (B) is more than 100 parts by weight or the proportion of the long-chain glycol (C) is smaller than 20 parts by weight, the flexibility of the resulting product becomes insufficient. Furthermore, if the total amount of the components (B) and (C) is less than 50 parts by weight, the surface hardness and scratch resistance of the resulting product become insufficient, and if it exceeds 120 parts by weight, the surface hardness of the product is also reduced.

When the proportion of the initial condensate (D) is less than 4 parts by weight, the surface hardness of the resulting product is not sufficient, and if it exceeds 200 parts by weight, the flexibility of the product is reduced. The condensate (D) serves to increase the surface hardness of the product, and also performs an action of removing the disadvantages of the melaminetype resin, such as the reduction with time of surface hardness, and increasing the weatherability of the surface coating.

The solvent used to prepare the heat-curable, film-forming liquid composition containing the components (A) to (E) is a non-solvent for the aromatic polycarbonate as in the preparation of the pre-treating amino alcohol solution. Preferably, the solvent is a lower alcohol such as ethanol, isopropanol and isobutanol. These solvents may be used singly or in admixture. As required, the lower alcohol solvent may be used as a mixture with an ether, a ketone or an ester. Examples of the ether are ethyl Cellosolve (ethylene glycol monoethyl ether) and butyl Cellosolve (ethylene glycol monobutyl ether). Examples of the ketone are methyl ethyl ketone, methyl isobutyl ketone and diisobutyl ketone. Examples of the ester are ethyl acetate and butyl acetate. Such a solvent is properly selected by considering its ability to dissolve the components (A) to (E) and as required, other additives. A mixture of isobutyl alcohol and butyl Cellosolve, preferably in a weight ratio of 4:about 1, is an especially preferred non-solvent for the aromatic hydrocarbonate, which is used to form the heat-curable, film-forming liquid composition.

The concentration of the heat-curable, film-forming liquid composition can be properly selected, and is, for example, about 5 to about 40% by weight, preferably about 10 to about 35% by weight, especially preferably about 20 to about 30% by weight.

According to the process of this invention, the aromatic polycarbonate article pre-treated as above is then coated with the aforesaid heat-curable, film-forming liquid composition by any known means such as dip coating, flour coating, brush coating, roll coating or spray coating.

As required, the pre-treating amino alcohol solution and the heat-curable film-forming liquid composition may further contain additives.

Examples of the additives include a levelling agent for improving the smoothness to the resulting coated film, such as a block copolymer of an alkylene oxide and dimethylsiloxane; an ultraviolet absorber which enhances the weatherability of the coated film, such as 2-hydroxy-4-methoxybenzophenone, 2-hydroxy-4-octoxybenzophenone, 2-(2'-hydroxy-5'-methylphenyl)-benzotriazole and 2-(2'-hydroxy-4'-octoxyphenyl)benzotriazole; and coloring agents which do not substantially affect the transparency of the coated film adversely, such as dyes. The amount of the levelling agent used is, for example, about 0.01 to about 1.0% by weight based on the liquid composition.

In step (2) of the process of this invention, the resulting coated aromatic polycarbonate article is heat-treated until the temperature reaches a range higher than 160° C. but not exceeding about 180° C., preferably about 165° to about 175° C., and maintained at a temperature within this range for about 10 to about 60 minutes, preferably about 15 to about 30 minutes. Thus, there can be obtained an aromatic polycarbonate article having a heat-cured surface layer which possesses the various improved properties mentioned hereinabove.

The heat-treatment in step (2) can be carried out in one or a plurality of stages. For example, it can be carried out in one stage by progressively or stepwise increasing the heating temperature at the desired rate of temperature raising until the temperature reaches a point higher than 160° C. but not exceeding about 180° C., preferably about 165° to about 175° C., and then heating the coated article at a temperature within the above temperature range for at least about 10 minutes, usually about 10 to about 60 minutes, preferably about 15 to about 30 minutes. Or it may be carried out in two stages by heat-treating the coated article at a temperature of less than 150° C., preferably about 100° to about 140° C., more preferably about 110° to about 130° C., for a period of, for example, about 15 to about 120 minutes, preferably about 30 to about 60 minutes in a first stage, and heat-treating it further at a temperature higher than 160° C. but not exceeding about 180° C., preferably about 165° to about 175° C., for a period of about 10 to about 60 minutes, preferably about 15 to about 30 minutes.

According to the process of this invention, an aromatic polycarbonate article having a heat-cured surface coating which possesses a high surface hardness (representing excellent scratch resistance), excellent weatherability, excellent wet heat resistance, excellent bendability under heat, etc. can be produced without sacrificing the inherent excellent impact strength of the aromatic polycarbonate article by coating the pretreated aromatic polycarbonate article with the heat-curable, film-forming liquid composition under the parameters of step (1) and heat-curing the coated article under the parameters shown in step (2).

The process of this invention has the further advantage that in step (2), the coated article can be bent to provide a suitable curving during or after the heating operation at more than 160° C. and not more than about 180° C., preferably about 165° to about 175° C. for about 10 to about 60 minutes, and within a relatively short period of time during which the above temperature can still be maintained. In particular, it is possible to employ the aforesaid two-stage operation and to re-shape the coated article for example in the form of a flat plate heat-treated in the first stage into the final desired shape having a suitable curve as in an automobile windshield glass, a motorcycle windshield, or the like in the second-stage. It has previously been not known that an aromatic polycarbonate article having a heat-cured surface layer and possessing the aforesaid excellent properties can be formed by re-shaping the coated article easily and operationally advantageously into the final desired shape after the formation of the surface coating.

Temperatures higher than about 180° C. should not be used in step (2) because such will result in excessive softening of the coated aromatic polycarbonate article or foaming, and also the coated layer is likely to be overcured.

The aromatic polycarbonate article having an improved surface hardness obtained by this invention has the advantage that it is scarcely injured even when rubbed with a hard material such as steel wool. For this reason, the merchandize value of the polycarbonate articles whose application has been limited because of their low surface hardness can be increased greatly by the present invention. Moreover, since their flexibility is excellent, their excellent bendability can be retained. Because of these advantages, the aromatic polycarbonate article produced by the process of this invention can also be used in applications which have previously been limited.

The following examples illustrate the present invention more specifically.

The properties of the coated aromatic polycarbonate articles obtained in these examples were evaluated by the following methods.

(A) Appearance

The sample was viewed with the naked eye to determine the presence or absence of unusual conditions such as cracking, crazing, orange peel, haze, coloration, etc., and the result was evaluated on the following standard.
A: No unusual condition was noted.
B: Some unusual condition was noted, but was not detrimental to practical applications.
C: A marked unusual condition was noted.

(B) Surface hardness From a height of 635 mm, 800 g of #2C-80 carborundum was dropped onto the sample inclined at 45° in accordance with JIS T-8147. The difference in haze (Δhaze) before and after the falling of the carborundum was measured by an integrating sphere type haze meter.

(C) Adhesion

Eleven cuts were provided with a knife on the coated surface of the sample both longitudinally and transversely at intervals of 1 mm to form 100 cut squares. An adhesive cellophane tape (Cellotape, a tradename for a product of Nichiban Kabushiki Kaisha) was bonded to the cut surface, and then abruptly peeled off in a direction at 90°. The number of squares which remained unpeeled was counted.

(D) Impact strength

In accordance with ASTM D-256, the Izod impact strength (kg.cm/cm) was measured using a notched sample having a thickness of ⅛ inch.

(E) Bendability

The sample which was fully softened as a result of undergoing heat-treatment at a temperature higher than 160° C. but not exceeding 180° C. was wrapped about a wooden cylindrical member having the radius of curvature shown below, and the occurrence of cracks was examined. The result was evaluated on the following standard.
A: No crack formed when a cylindrical member having a radius of curvature of less than 80 mm was used.
B: No crack formed when a cylindrical member having a radius of curvature of at least 80 mm but less than 800 mm was used.
C: Cracks formed when a cylindrical member having a radius of curvature of at least 800 mm was used. Or cracks occurred only by heating.

(F) Weatherability

The sample was exposed for 400 hours to a carbon arc-type Sunshine Weather-Ometer (Model WE-SUN-DC, a tradename for a product of Suga Testing Instrument Co., Ltd.) in accordance with JIS K-5400, and then the surface hardness and adhesion of the sample were measured in accordance with (B) and (C) above.

(G) Wet heat resistance

The sample was treated for 144 hours in a constant temperature-humidity vessel kept at 50° C. and 98% RH, and then its surface hardness and adhesion were measured in accordance with (B) and (C) above.

EXAMPLE 1

(1) Preparation of a solution of an initial condensate of methyltrimethoxysilane by hydrolysis To a solution of 272 parts by weight of methyltrimethoxysilane ("KBM-13", a tradename for a product of Shin-etsu Chemical Co., Ltd.) in 228 parts by weight of isopropyl alcohol was added dropwise 108 parts by weight of a 0.01 N aqueous solution of hydrochloric acid so that the temperature of the mixture reached 20° to 25° C. After the reaction, the reaction mixture was allowed to stand overnight at room temperature. The resulting solution contained 31% of the initial condensate of methyltrimethoxysilane.

(2) Preparation of a coating composition

One hundred parts by weight of methoxymethylmelamine ("Cymel-350", a tradename for a product of Mitsui Toatsu Chemicals, Inc.), 40 parts by weight of 1,4-butanediol as a short-chain glycol and 20 parts by weight of polyethylene glycol 400 as a long-chain glycol were dissolved in a mixture of 400 parts by weight of isobutanol and 100 parts by weight of butyl Cellosolve. Furthermore, 4 parts by weight of p-toluenesulfonic acid as a curing catalyst, 4 parts by weight of 2-hydroxy-4-octoxybenzophenone as an ultraviolet absorber and 50 parts by weight of the solution prepared in (1) above were further added. They were mixed with stirring at room temperature to prepare a coating composition.

(3) Pre-treatment of a polycarbonate article

A polycarbonate sheet having a thickness of 2 mm ("Panlite Sheet", a tradename for a product of Teijin Chemical Co., Ltd.) was coated with a 1% isobutanol solution of diethanolamine by a dip coating method, and the coated sheet was dried at 100° C. for 20 minutes.

(4) Coating of the pre-treated polycarbonate article

The pre-treated polycarbonate sheet was dipped in the coating composition prepared in (2) above, and heated in a hot air dryer at 125° C. for 1 hour and heated at 175° C. for 15 minutes.

The same procedure as above was repeated using a polycarbonate article prepared for impact strength measurement.

The resulting sheet and the sample for impact strength test were subjected to the same property measurement as shown above. The results are shown in Table 3-a and 3-b.

EXAMPLES 2 TO 15 AND COMPARATIVE EXAMPLES 1 TO 21

Sheets and impact test samples were prepared in the same way as in Example 1 except as noted in Tables 1-a, 1-b, 2-a, 2-b and 2-c. The results are shown in Tables 3-a and 3-b.

In Comparative Examples 1 to 5, the temperature at which the coated article was heat-treated was below the specified range; in Comparative Examples 6 to 9, the total amount of the short-chain glycol and the long-chain glycol was either above the specified upper limit or below the specified lower limit; in Comparative Example 10, the number of main-chain atoms of the long-chain glycol was too large; in Comparative Example 11, the hydrolyzate of a silicon compound was not used; in Comparative Example 12, the amount of the hydrolyzate of a silicon compound was larger than the specified limit; in Comparative Example 13, no curing agent was used; in Comparative Example 14, the pre-treatment of the polycarbonate article with the amino alcohol solution was not performed; in Comparative Example 15, ethylenediamine was used for the pre-treatment; in Comparative Example 16, the amino alcohol used had a boiling point higher than 300° C.; in Comparative Examples 17 to 20, the temperature at which the coated polycarbonate article was heated was outside the specified range; and Comparative Example 21 shows the properties of an untreated uncoated polycarbonate article. It is seen that the products obtained in Examples 1 to 15 had well-balanced properties, whereas the products obtained in Comparative Examples 1 to 21 did not show a balance in their properties.

All of the coating compositions used in the above examples further contained 4 parts by weight of 2-hydroxy-4-octoxybenzophenone as an ultraviolet absorber.

In Tables 2-a, 2-b and 2-c, the following abbreviations were used. The double prime mark in their Tables shows that it is the same as before. In those examples where two heating conditions are given, the heating was first carried out under the conditions given on top and then under the conditions given at bottom.

EG: ethylene glycol
DEG: diethylene glycol
TEG: triethylene glycol
1,4-BD: 1,4-butanediol
PEG-200: polyethylene glycol (molecular weight 200)
PEG-400: polyethylene glycol (molecular weight 400)
PEG-2000: polyethylene glycol (molecular weight 2000)
p-TSA: p-toluenesulfonic acid
BC: butyl Cellosolve
IBA: isobutyl alcohol

TABLE 1-a

| Example (Ex.) or Comparative Example (CEx.) | Composition of a pre-treating solution | | Drying conditions | |
|---|---|---|---|---|
| | Type | Concentration (%) | Temperature (°C.) | Time (minutes) |
| Ex. 1 | Diethanolamine | 1 | 100 | 20 |
| Ex. 2 | Diethanolamine | 1 | 100 | 20 |
| Ex. 3 | Diethanolamine | 1 | 100 | 20 |
| Ex. 4 | Diethanolamine | 1 | 100 | 20 |
| Ex. 5 | Diethanolamine | 1 | 100 | 20 |
| CEx. 1 | Diethanolamine | 1 | 100 | 20 |
| CEx. 2 | Diethanolamine | 1 | 100 | 20 |
| CEx. 3 | Diethanolamine | 1 | 100 | 20 |
| CEx. 4 | Diethanolamine | 1 | 100 | 20 |
| CEx. 5 | Diethanolamine | 1 | 100 | 20 |
| CEx. 6 | Diethanolamine | 1 | 100 | 20 |
| CEx. 7 | Diethanolamine | 1 | 100 | 20 |
| CEx. 8 | Diethanolamine | 1 | 100 | 20 |
| CEx. 9 | Diethanolamine | 1 | 100 | 20 |
| CEx. 10 | Diethanolamine | 1 | 100 | 20 |
| Ex. 6 | Monoethanolamine | 0.5 | 100 | 20 |
| Ex. 7 | Monoethanolamine | 0.5 | 50 | 30 |
| Ex. 8 | Monoethanolamine | 0.5 | 90 | 15 |

TABLE 1-b

| Example (Ex.) or Comparative Example (CEx.) | Composition of a pre-treating solution | | Drying conditions | |
|---|---|---|---|---|
| | Type | Concentration (%) | Temperature (°C.) | Time (minutes) |
| Ex. 9 | Monoethanolamine | 0.5 | 90 | 15 |
| Ex. 10 | Monoethanolamine | 0.5 | 90 | 15 |
| CEx. 11 | Monoethanolamine | 0.5 | 90 | 15 |
| CEx. 12 | Monoethanolamine | 0.5 | 90 | 15 |
| CEx. 13 | Monoethanolamine | 0.5 | 90 | 15 |
| CEx. 14 | Not used | — | — | — |
| CEx. 15 | Ethylenediamine | 1.0 | 100 | 20 |
| CEx. 16 | Triethanolamine | 1.0 | 100 | 20 |
| Ex. 11 | Monoethanolamine | 0.5 | 100 | 20 |
| Ex. 12 | Monoethanolamine | 0.5 | 100 | 20 |
| Ex. 13 | Monoethanolamine | 0.5 | 100 | 20 |
| Ex. 14 | Monoethanolamine | 0.5 | 100 | 20 |
| Ex. 15 | Monoethanolamine | 0.5 | 100 | 20 |
| CEx. 17 | Monoethanolamine | 0.5 | 100 | 20 |
| CEx. 18 | Monoethanolamine | 0.5 | 100 | 20 |
| CEx. 19 | Monoethanolamine | 0.5 | 100 | 20 |
| CEx. 20 | Monoethanolamine | 0.5 | 100 | 20 |
| CEx. 21 | Not used | — | — | — |

TABLE 2-a

| Example (Ex.) or Comparative Example (CEx.) | Components of the coating composition (parts by weight) | | | | | | Heating conditions | |
|---|---|---|---|---|---|---|---|---|
| | A | B | C | D | E | Solvent | Temperature (°C.) | Time (minutes) |
| Ex.1 | Cymel-350 (100) | EG (40) | PEG-400 (20) | CH$_3$Si(OCH$_3$)$_3$ (50) | p-TSA (4) | IBA (400) BC (100) | 125 170 | 60 15 |
| Ex. 2 | Cymel-350 (100) | DEG (30) | PEG-400 (30) | CH$_3$Si(OCH$_3$)$_3$ (50) | p-TSA (4) | IBA (400) BC (100) | 125 170 | 60 15 |
| Ex. 3 | Cymel-350 (100) | TEG (40) | PEG-200 (20) | CH$_3$Si(OCH$_3$)$_3$ (50) | p-TSA (4) | IBA (400) BC (100) | 125 170 | 60 15 |
| Ex. 4 | Cymel-350 (100) | 1,4-BD (40) | PEG-400 (20) | CH$_3$Si(OCH$_3$)$_3$ (50) | p-TSA (4) | IBA (400) BC (100) | 125 170 | 60 15 |
| Ex. 5 | Cymel-350 (100) | 1,4-BD (60) | PEG-200 (30) | CH$_3$Si(OCH$_3$)$_3$ (50) | p-TSA (4) | IBA (400) BC (100) | 125 170 | 60 15 |
| CEx. 1 | Same as in Example 1 | | | | | | 125 | 60 |
| CEx. 2 | Same as in Example 2 | | | | | | 125 | 60 |
| CEx. 3 | Same as in Example 3 | | | | | | 125 | 60 |

TABLE 2-a-continued

| Example (Ex.) or Comparative Example (CEx.) | Components of the coating composition (parts by weight) | | | | | | Heating conditions | |
|---|---|---|---|---|---|---|---|---|
| | A | B | C | D | E | Solvent | Temperature (°C.) | Time (minutes) |
| CEx. 4 | | | Same as in Example 4 | | | | 125 | 60 |
| CEx. 5 | | | Same as in Example 5 | | | | 125 | 60 |
| CEx. 6 | Cymel-350 (100) | DEG (30) | not used | $CH_3Si(OCH_3)_3$ (50) | p-TSA (4) | IBA (400) BC (100) | 125 170 | 60 15 |
| CEx. 7 | Cymel-350 (100) | not used | PEG-400 (30) | $CH_3Si(OCH_3)_3$ (50) | p-TSA (4) | IBA (400) BC (100) | 125 170 | 60 15 |

TABLE 2-b

| Example (Ex.) or Comparative Example (CEx.) | Components of the coating composition (parts by weight) | | | | | | Heating conditions | |
|---|---|---|---|---|---|---|---|---|
| | A | B | C | D | E | Solvent | Temperature (°C.) | Time (minutes) |
| CEx. 8 | Cymel-350 (100) | TEG (40) | PEG-200 (5) | $CH_3Si(OCH_3)_3$ (50) | p-TSA (4) | IBA (400) BC (100) | 125 170 | 60 15 |
| CEx. 9 | Cymel-350 (100) | TEG (40) | PEG-200 (100) | $CH_3Si(OCH_3)_3$ (50) | p-TSA (4) | IBA (600) BC (200) | 125 170 | 60 15 |
| CEx. 10 | Cymel-350 (100) | TEG (40) | PEG-2000 (20) | $CH_3Si(OCH_3)_3$ (50) | p-TSA (4) | IBA (400) BC (100) | 125 170 | 60 15 |
| Ex. 6 | Cymel-300 (100) | TEG (40) | PEG-200 (20) | $CH_3Si(OCH_3)_3$ (50) | p-TSA (4) | IBA (400) BC (100) | 170 | 20 |
| Ex. 7 | Cymel-300 (100) | TEG (40) | PEG-200 (20) | $CH_3Si(OCH_3)_3$ (50) | p-TSA (4) | IBA (400) BC (100) | " | " |
| Ex. 8 | Cymel-300 (100) | TEG (40) | PEG-200 (20) | $CH_3Si(OCH_3)_3$ (50) | Oxalic acid (5) | IBA (400) BC (100) | " | " |
| Ex. 9 | Cymel-300 (100) | TEG (40) | PEG-200 (20) | $CH_3Si(OCH_3)_3$ (50) | Maleic acid (5) | IBA (400) BC (100) | " | " |
| Ex. 10 | Cymel-300 (100) | TEG (40) | PEG-200 (20) | $CH_3Si(OCH_3)_3$ (50) | p-TSA (4) | IBA (400) BC (100) | " | " |
| CEx. 11 | Cymel-350 (100) | TEG (40) | PEG-200 (20) | not used | p-TSA (4) | IBA (400) BC (100) | " | " |
| CEx. 12 | Cymel-350 (100) | TEG (40) | PEG-200 (20) | $CH_3Si(OCH_3)_3$ (700) | p-TSA (4) | IBA (400) BC (100) | " | " |
| CEx. 13 | Cymel-350 (100) | TEG (40) | PEG-200 (20) | $CH_3Si(OCH_3)_3$ (50) | not used | IBA (400) BC (100) | " | " |
| CEx. 14 | Cymel-350 (100) | TEG (40) | PEG-200 (20) | $CH_3Si(OCH_3)_3$ (50) | p-TSA (4) | IBA (400) BC (100) | " | " |

TABLE 2-c

| Example (Ex.) or Comparative Example (CEx.) | Components of the coating composition (parts by weight) | | | | | | Heating conditions | |
|---|---|---|---|---|---|---|---|---|
| | A | B | C | D | E | Solvent | Temperature (°C.) | Time (minutes) |
| CEx. 15 | Cymel-350 (100) | TEG (40) | PEG-200 (20) | $CH_3Si(OCH_3)_3$ (50) | p-TSA (4) | IBA (400) BC (100) | 170 | 20 |
| CEx. 16 | Cymel-350 (100) | TEG (40) | PEG-200 (20) | $CH_3Si(OCH_3)_3$ (50) | p-TSA (4) | IBA (400) BC (100) | 170 | 20 |
| Ex. 11 | Cymel-350 (100) | TEG (40) | PEG-200 (20) | $CH_3Si(OCH_3)_3$ (50) | p-TSA (4) | IBA (400) BC (100) | 165 | 20 |
| Ex. 12 | Cymel-350 (100) | TEG (40) | PEG-200 (20) | $CH_3Si(OCH_3)_3$ (50) | p-TSA (4) | IBA (400) BC (100) | 175 | 20 |
| Ex. 13 | Cymel-350 (100) | TEG (40) | PEG-200 (20) | $CH_3Si(OCH_3)_3$ (50) | p-TSA (4) | IBA (400) BC (100) | 130 170 | 60 20 |
| Ex. 14 | Cymel-350 (100) | TEG (40) | PEG-200 (20) | $CH_3Si(OCH_3)_3$ (50) | p-TSA (4) | IBA (400) BC (100) | 130 170 | 120 20 |
| Ex. 15 | Cymel-350 (100) | TEG (40) | PEG-200 (20) | $CH_3Si(OCH_3)_3$ (50) | p-TSA (4) | IBA (400) BC (100) | 155 170 | 30 20 |
| CEx. 17 | Cymel-350 (100) | TEG (40) | PEG-200 (20) | $CH_3Si(OCH_3)_3$ (50) | p-TSA (4) | IBA (400) BC (100) | 130 | 60 |
| CEx. 18 | Cymel-350 (100) | TEG (40) | PEG-200 (20) | $CH_3Si(OCH_3)_3$ (50) | p-TSA (4) | IBA (400) BC (100) | 130 | 120 |
| CEx. 19 | Cymel-350 (100) | TEG (40) | PEG-200 (20) | $CH_3Si(OCH_3)_3$ (50) | p-TSA (4) | IBA (400) BC (100) | 155 | 30 |
| CEx. 20 | Cymel-350 (100) | TEG (40) | PEG-200 (20) | $CH_3Si(OCH_3)_3$ (50) | p-TSA (4) | IBA (400) BC (100) | 185 | 20 |
| CEx. 21 | — | — | — | — | — | — | — | — |

TABLE 3-a

| | Properties of the aromatic polycarbonate article | | | | | | | |
|---|---|---|---|---|---|---|---|---|
| Ex. or CEx. | Initial properties | | | | Bendability | Weatherability | | Wet heat resistance | |
| | Appearance | Hardness | Adhesion | Impact strength | | Hardness | Adhesion | Hardness | Adhesion |
| Ex. 1 | A | 3 | 100 | 92 | A | 17 | 100 | 7 | 100 |
| Ex. 2 | A | 4 | 100 | 89 | A | 21 | 100 | 8 | 100 |
| Ex. 3 | A | 3 | 100 | 85 | A | 14 | 100 | 7 | 100 |
| Ex. 4 | A | 3 | 100 | 90 | A | 16 | 100 | 7 | 100 |
| Ex. 5 | A | 4 | 100 | 86 | A | 19 | 100 | 10 | 100 |
| CEx. 1 | A | 5 | 100 | 12 | — | 25 | 30 | 42 | 75 |
| CEx. 2 | A | 6 | 100 | 10 | — | 32 | 35 | 45 | 35 |
| CEx. 3 | A | 4 | 100 | 9 | — | 20 | 70 | 39 | 90 |
| CEx. 4 | A | 5 | 100 | 8 | — | 24 | 40 | 44 | 70 |
| CEx. 5 | A | 5 | 100 | 9 | — | 31 | 40 | 45 | 80 |
| CEx. 6 | C (cracked) | 2 | 100 | — | C | 6 | 100 | 7 | 100 |
| CEx. 7 | A | 22 | 100 | — | A | 37 | 0 | 43 | 0 |
| CEx. 8 | B (cracked) | 3 | 100 | — | C | 18 | 100 | 8 | 100 |
| CEx. 9 | A | 33 | 100 | — | A | 54 | 0 | 57 | 0 |
| CEx. 10 | A | 12 | 100 | — | A | 31 | 25 | 38 | 10 |
| Ex. 6 | A | 3 | 100 | 89 | A | 15 | 100 | 8 | 100 |
| Ex. 7 | A | 3 | 100 | 89 | A | 16 | 100 | 7 | 100 |
| Ex. 8 | A | 3 | 100 | 91 | A | 17 | 100 | 8 | 100 |

TABLE 3-b

| | Properties of the aromatic polycarbonate article | | | | | | | |
|---|---|---|---|---|---|---|---|---|
| Ex. or CEx. | Initial properties | | | | Bendability | Weatherability | | Wet heat resistance | |
| | Appearance | Hardness | Adhesion | Impact strength | | Hardness | Adhesion | Hardness | Adhesion |
| Ex. 9 | A | 2 | 100 | 87 | A | 15 | 100 | 6 | 100 |
| Ex. 10 | A | 2 | 100 | 86 | A | 14 | 100 | 6 | 100 |
| CEx. 11 | A | 14 | 100 | — | A | 32 | 70 | 40 | 100 |
| CEx. 12 | C (cracked) | 5 | 100 | — | C | 12 | 0 | 6 | 0 |
| CEx. 13 | A | 67 | 0 | — | A | 72 | 0 | 78 | 0 |
| CEx. 14 | A | 3 | 30 | — | A | 16 | 0 | 8 | 0 |
| CEx. 15 | A | 3 | 100 | — | A | 15 | 0 | 9 | 0 |
| CEx. 16 | B (hazy) | 14 | 70 | — | A | 28 | 0 | 23 | 0 |
| Ex. 11 | A | 4 | 100 | 86 | A | 17 | 100 | 9 | 100 |
| Ex. 12 | A | 3 | 100 | 88 | A | 15 | 100 | 6 | 100 |
| Ex. 13 | A | 3 | 100 | 89 | A | 14 | 100 | 7 | 100 |
| EX. 14 | A | 2 | 100 | 87 | A | 13 | 100 | 5 | 100 |
| Ex. 15 | A | 2 | 100 | 86 | A | 13 | 100 | 4 | 100 |
| CEx. 17 | A | 5 | 100 | 8 | — | 22 | 95 | 9 | 80 |
| CEx. 18 | A | 4 | 100 | 7 | — | 19 | 70 | 8 | 60 |
| CEx. 19 | A | 4 | 100 | 64 | — | 20 | 100 | 10 | 100 |
| CEx. 20 | C (foamed) | 3 | 100 | 87 | B | 13 | 100 | 5 | 100 |
| CEx. 21 | A | 62 | — | 87 | A | 56 | — | 65 | — |

What we claim is:

1. A process for producing a molded article of an aromatic polycarbonate having a heat-cured surface layer, which comprises:
   (1) coating an aromatic polycarbonate article pretreated with a solution of an amino alcohol containing a primary or secondary amino group and a hydroxyl group and having a boiling point of not more than 300° C. in a solvent for the aromatic polycarbonate, with a heat-curable film-forming liquid composition consisting of a solution, in a non-solvent for the aromatic polycarbonate, of
   (A) 100 parts by weight of methyl-etherified methylolmelamine,
   (B) 20 to 100 parts by weight of a short-chain glycol having 2 to 8 main-chain atoms between the two hydroxyl groups and represented by the following formula

(1)

wherein $R^1$ represents a main-chain alkylene group having at least 2 carbon atoms which may have an alkyl group with not more than 2 carbon atoms at a side chain, and m represents 1, 2 or 3,
   (C) 20 to 100 parts by weight of a long-chain glycol having at least 11 main-chain atoms between the two hydroxyl groups and represented by the following formula

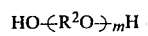

(2)

wherein $R^2$ represents a main-chain alkylene group having at least 2 carbon atoms which may have an alkyl group with not more than 2 carbon atoms at a side chain, and n represents an integer of from 3 to 20, the total amount of the components (B) and (C) being 50 to 120 parts by weight, (D) 4 to 200 parts by weight of an initial condensate resulting from hydrolysis of a compound of the following formula

$$R^3-Si\text{\textendash}(OR^4)_3 \quad (3)$$

wherein $R^3$ represents a hydrocarbon group having 1 to 6 carbon atoms and $R^4$ represents an alkyl group having 1 to 4 carbon atoms, and (E) 1 to 20 parts by weight of a curing agent; and (2) heat-treating the coated aromatic polycarbonate article until the temperature is higher than 160° C. but does not exceed about 180° C. and maintaining it at a temperature within said range for about 10 to 60 minutes.

2. The process of claim 1 wherein the temperature at which the heat-treated article is maintained in step (2) is 165° C. to 175° C.

3. The process of claim 1 wherein the time during which the heat-treated article is maintained in step (2) is about 15 to about 30 minutes.

4. A process for producing a molded article of an aromatic polycarbonate having a heat-cured surface layer, which comprises:

(1) coating an aromatic polycarbonate article pretreated with a solution of an amino alcohol containing a primary or secondary amino group and a hydroxyl group and having a boiling point of not more than 300° C. in a non-solvent for the aromatic polycarbonate, with a heat-curable film-forming liquid composition consisting of a solution, in a non-solvent for the aromatic polycarbonate, of (A) 100 parts by weight of methyl-etherified methylolmelamine, (B) 20 to 100 parts by weight of a short-chain glycol having 2 to 8 main-chain atoms between the two hydroxyl groups and represented by the following formula

$$HO\text{\textendash}(R^1O)_m\text{\textendash}H \quad (1)$$

wherein $R^1$ represents a main-chain alkylene group having at least 2 carbon atoms which may have an alkyl group with not more than 2 carbon atoms at a side chain, and m represents 1, 2 or 3, (C) 20 to 100 parts by weight of a long-chain glycol having at least 11 main-chain atoms between the two hydroxyl groups and represented by the following formula

$$HO\text{\textendash}(R^2O)_n\text{\textendash}H \quad (2)$$

wherein $R^2$ represents a main-chain alkylene group having at least 2 carbon atoms which may have an alkyl group with not more than 2 carbon atoms at a side chain, and n represents an integer of from 3 to 20, the total amount of the components (B) and (C) being 50 to 120 parts by weight, (D) 4 to 200 parts by weight of an initial condensate resulting from hydrolysis of a compound of the following formula

$$R^3-Si\text{\textendash}(OR^4)_3 \quad (3)$$

wherein $R^3$ represents a hydrocarbon group having 1 to 6 carbon atoms and $R^4$ represents an alkyl group having 1 to 4 carbon atoms, and (E) 1 to 20 parts by weight of a curing agent; and (2) heat treating the coated aromatic polycarbonate article at a first temperature range of from about 100° to 140° C. for a period of from about 15 to about 120 minutes and further heat treating at a second temperature which is above 160° C. but not exceeding 180° C. for a period of about 10 to about 60 minutes.

5. The process of claim 1 or 4 wherein the aromatic polycarbonate is a polycarbonate derived from 0 to 10 mole% of at least one dihydric phenol other than bisphenol A and the remainder being bisphenol A.

6. The process of claim 1 or 4 wherein said non-solvent is a mixture of isobutyl alcohol and butyl Cellosolve.

7. The process of claim 4 wherein in step (2), the first temperature range is from about 110° to about 130° C. and the second temperature is from about 165° to about 175° C.

8. The process of claim 7 wherein the article is maintained in the first temperature range for a period of about 30 to about 60 minutes and the second temperature is maintained for a period of about 15 to about 30 minutes.

* * * * *